Nov. 13, 1951   D. A. HUGHES   2,574,973
VISCOSIMETER
Filed June 15, 1950
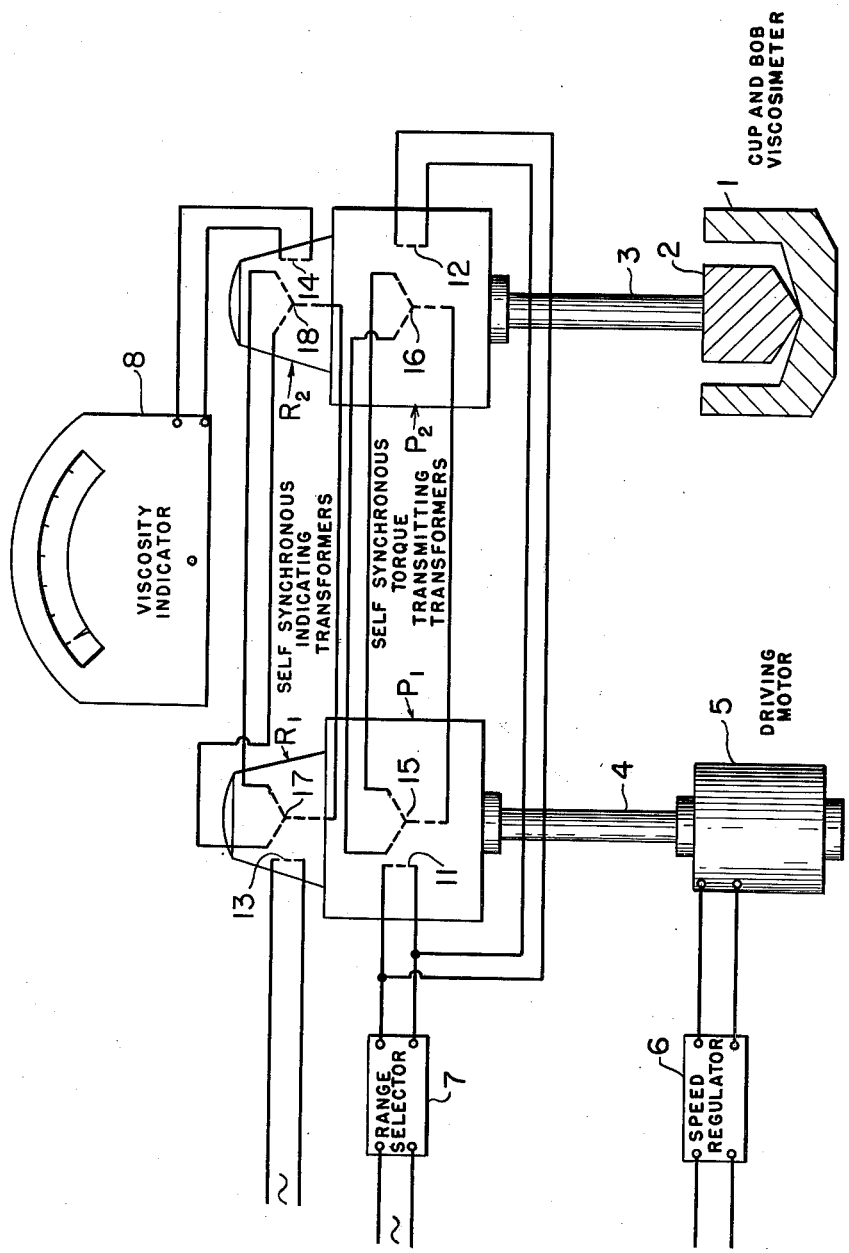
INVENTOR.
Donald A. Hughes
BY
Adams, Forward and McLean
ATTORNEYS Patented Nov. 13, 1951

2,574,973

UNITED STATES PATENT OFFICE 2,574,973

VISCOSIMETER

Donald A. Hughes, Norwalk, Conn.

Application June 15, 1950, Serial No. 168,330

1 Claim. (Cl. 73—59)

I have invented an improved viscosimeter which has several important advantages. My new viscosimeter embodies an application of the principles established by Renier currently used in rotational viscometric measurement, but in my new viscosimeter the torque upon which the viscometric measurement depends is applied and measured in a novel manner. Essentially, the viscosimeter of my invention comprises a driven rotating member responding in torque to the viscosity to be measured, the cup or the bob of a conventional cup-bob system, for example, and a driver, conveniently an electric motor, for this driven member, a voltage indicator and two pairs of self-synchronous rotating transformers. The three phase elements of each pair of rotating transformers are electrically connected. One single phase element of each pair is connected to a source of alternating current. The second single phase element of one pair is connected to the same source of alternating current as the other single phase element of that pair. The second single phase element of the other pair is electrically connected to an indicator responding to voltage differences. This indicator may be calibrated directly in units of viscosity. The first rotating element of each pair is mechanically connected to a shaft driven by the driver. The second rotating element of each pair, including the rotating element connected to the voltage indicator, is mechanically connected to a separate shaft carrying the driven member. The rotating elements may be either the single phase elements or the three phase elements but, in any case, the rotating elements of each pair are either both single phase elements or both three phase elements. With this arrangement, the torque transmitted from the driver to the driven member through the first pair of self-synchronous rotating transformers, a direct measurement of the viscosity of the material in which the driven member is rotating, is precisely measured as a function of the phase displacement of the rotating elements of the second pair of self-synchronous rotating transformers.

In conventional instruments for rotational viscometric measurement, the driven member is rotated at constant speed and the torque required to balance this rotation is measured by one of several varieties of torsion balances. In some instruments, the balance measuring rheological torque is effected with weights, and in such instruments the range of viscosities which can be measured within the limits of accuracy characteristic of the particular instrument is wide but manipulation is difficult and the viscosity being measured is reported only at intervals as successive balances are established. In other instruments, this balance is effected with springs, or torsion members, but in such instruments, although continuous reporting of the viscosity to be measured is possible, measurements of accuracy within the limits characteristic of the particular instrument can be attained only over relatively narrow ranges. For many purposes, the range over which accurate measurements are reported, without re-assembling the instrument with each of several springs or torsion members or with each of several bobs or cups, for example, is too narrow to meet practical requirements and the manipulation involved in such re-assembling is impractical. Further, such instruments, as a generality, are delicate, usually complex, and expensive to construct and to maintain in service. However, notwithstanding the expanding demand for a more satisfactory instrument resulting from an expanding industrial appreciation of rheological values, the instruments available have remained subject to these and other infirmities.

The viscosimeter of my invention is simple and sturdy in construction. It meets the demands of industrial service as well as those of the laboratory. It can be used as a control instrument and is not limited to use as an indicating instrument. It reports the measured viscosity continuously. It enjoys accuracy of a high order over a wide range, and its range can be shifted as rapidly and as frequently as may be desired without interrupting the continuity of its reporting. In my new viscosimeter, such shifting of the range of the instrument is accomplished by electrically, rather than mechanically, changing the physical parameters of the instrument. My new viscosimeter is particularly useful in following and in controlling processes in which viscosity is a function of the extent to which some chemical reaction has proceeded. In many such applications, the range through which viscosity progresses may be very wide yet the range in which it is critical, and must be measured with extreme accuracy, is quite narrow. In such applications, my improved viscosimeter will serve as no previous instrument has been capable of serving.

I have illustrated one embodiment of my invention in the accompanying diagrammatic drawing. In this drawing, the cup and bob system is illustrated in vertical section. The shaft carrying the bob in this embodiment is illustrated as mechanically connected to one of the rotors, in this embodiment the single phase elements, of each of two pairs of self-synchronous rotating transformers, the shaft mechanically connected to the driving motor is illustrated as connected to the other two rotors, in this embodiment the single phase elements, of the two pairs of self-synchronous rotating transformers, both in elevation, and the indicator responding to voltage differences, the driving motor, the electrical circuits involving the several self-synchronous rotating transformers, the electrical means for controlling the speed of the driving motor and the electrical means for controlling the electrical coupling between the torque transmitting pair of self-synchronous rotating transformers are illustrated diagrammatically.

Referring to the drawing: The cup and bob system illustrated, cup 1 and bob 2, is conventional and may be replaced with any other appropriate means for imposing upon the driven member, which may be either the bob or the cup or the equivalent of one of them, a frictional load proportional to the viscosity of the material measured. In the illustrated instrument, the bob 2 is carried and driven by the shaft 3. The shaft 4 is driven by motor 5 at a speed determined by controller 6, any electrical controller appropriate to the particular type of motor used. The rotor 11 of the self-synchronous rotating transformer $P_1$ and the rotor 13 of the rotating transformer $R_1$ are affixed to the shaft 4. The rotor 12 of the rotating transformer $P_2$ and the rotor 14 of the rotating transformer $R_2$ are affixed to the shaft 3. The stators 15 and 16, respectively, of the rotating transformers $P_1$ and $P_2$ are electrically connected as illustrated and the stators 17 and 18, respectively, of the rotating transformers $R_1$ and $R_2$ are electrically connected as illustrated. The rotors 11 and 12 are electrically connected to a common source of alternating current through a voltage controller 7 as illustrated. The rotor 13 is electrically connected to a source of alternating current, which may conveniently be the same as that to which the rotors 11 and 12 are connected through the voltage controller 7 and the rotor 14 is electrically connected to the voltage indicator 8 as illustrated. This voltage indicator 8 is with advantage calibrated directly in units of viscosity.

In operating the illustrated instrument, with the material being measured filling the annular space in the cup-bob system, the shaft 4 is driven at a predetermined constant speed by motor 5 and the shaft 3 is driven synchronously, at the same speed, by means of the electrical coupling between the self-synchronous rotating transformers $P_1$ and $P_2$, but as a result of the frictional drag between the cup 1 and the bob 2, a function of the viscosity of the material being measured, the shaft 3 lags in rotation by an angle related to the torque representing this frictional drag. The rate of shear at which the viscosity measurement is made can be regulated by controlling the speed at which the shaft 4 is driven, for example through the controller 6. For any given torque imposed upon the driven member, bob 2 in the instrument illustrated, the relative phase displacement can be regulated by controlling the voltage imposed upon the rotors of the self-synchronous rotating transformers $P_1$ and $P_2$, for example by means of the controller 7. Now since the rotors of the self-synchronous rotating transformers $R_1$ and $R_2$ are each respectively connected to the same shaft as the rotors of the rotating transformers $P_1$ and $P_2$, the phase displacement between the rotors of transformers $R_1$ and $R_2$ is identical with the phase displacement between the rotors of the transformers $P_1$ and $P_2$. Angular differences in the phase of rotation between the rotors of transformers $R_1$ and $R_2$ are reflected in voltage differences across the rotor 14 of the transformer $R_2$ and these differences are reported by the voltage indicator 8. The rheological torque and the angular phase displacement, beyond that very small displacement representing mechanical friction in a well-constructed instrument, are both proportional to the sine of the displacement angle. Thus, the voltage reported by the voltage indicator 8 is directly proportional to the torque and is a direct measure of the viscosity of the material being measured. This voltage also is inversely proportional to the voltage impressed on the rotors of the self-synchronous rotating transformers $P_1$ and $P_2$.

Calibration of the voltage indicator 8 in viscosity units depends upon the configuration and arrangement of the driven member 2 and the cup 1, the voltage impressed across the rotors of the transformers $P_1$ and $P_2$ and the voltage impressed across the rotor of the transformer $R_1$, but is independent of the speed at which the shafts 3 and 4 are rotated. The voltage impressed across the rotor of transformer $R_1$ serves merely to excite the system for measuring the phase displacement, but since it fixes the base for the calibration it must have a predetermined and constant value for any particular calibration of the indicator. The voltage impressed across the rotors of the transformers $P_1$ and $P_2$ fixes the relative phase displacement, the higher this voltage the less the phase displacement for any particular torque. The controller 7 thus is an advantageous means of shifting the range of the instrument by changing the degree of electrical coupling between the shafts 3 and 4. This controller may be arranged to provide a series of predetermined voltages through a transformer and a multi-position switch and the voltage indicator 8 may then be calibrated with a series of scales, one corresponding to each of these several voltages, each reading directly in viscosity units when the corresponding voltage is impressed on the rotors of the transformers $P_1$ and $P_2$. In this manner the range of the instrument can be shifted as rapidly and as frequently as may be desired without interrupting the continuity of the viscosity measurement reported by the indicator 8.

The operation and calibration of the instrument is the same whether the rotating elements of each pair of self-synchronous rotating transformers are the single phase elements, as in the embodiment illustrated, or are the three phase elements.

I claim:

In a viscosimeter comprising a driven rotating member responding in torque to the viscosity to be measured and a driver therefor, the improvement which comprises a pair of self-synchronous rotating transformers with electrically connected three phase elements and with single phase elements electrically connected to a common source of alternating current, the rotating element of one being mechanically connected to a shaft driven by the driver and the rotating element of the other being mechanically connected to a separate shaft carrying the driven member, and a second pair of self-synchronous rotating transformers with electrically connected three phase elements and with the single phase element of one being electrically connected to a source of alternating current and the single phase element of the other being electrically connected to an indicator responding to voltage differences, the rotating element of the transformer of the second pair of transformers connected to a source of current being mechanically connected to the shaft driven by the driver and the other rotating element of the second pair of transformers connected to the indicator being mechanically connected to the shaft carrying the driven member.

DONALD A. HUGHES.

REFERENCES CITED

The following references are of record in the file of this patent:

UNITED STATES PATENTS

| Number | Name | Date |
| --- | --- | --- |
| 2,459,830 | McCarthy | Jan. 25, 1949 |
| 2,485,424 | Weisz | Oct. 18, 1949 |
| 2,519,058 | Lundberg | Aug. 15, 1950 |